(No Model.)
S. WILKINS.
PORTABLE LEMONADE HOLDER AND GLASS WASHER COMBINED.
No. 423,650. Patented Mar. 18, 1890.
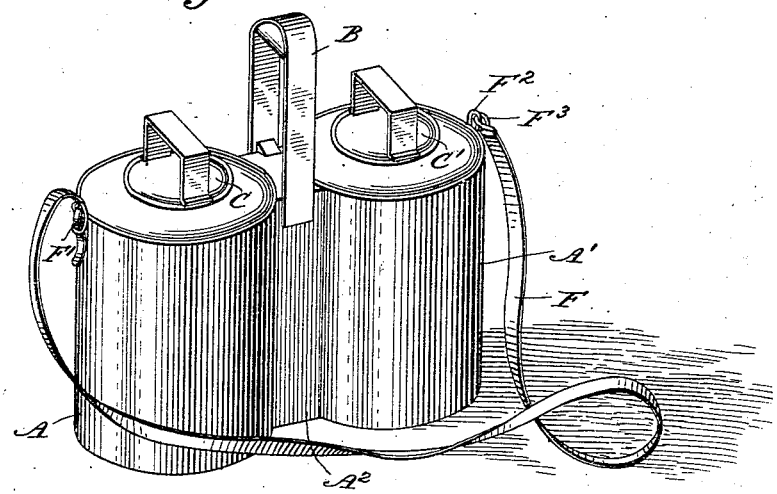
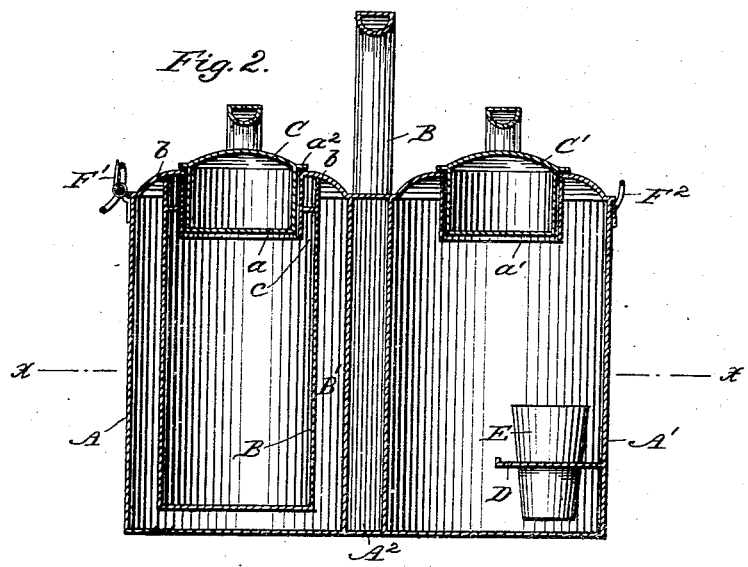
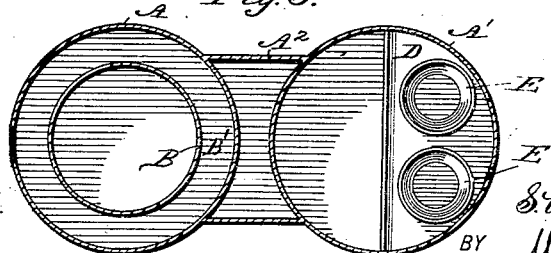
WITNESSES:
D. C. Reusch
C. Sedgwick
INVENTOR:
S. Wilkins
BY Munn & Co
ATTORNEYS.

UNITED STATES PATENT OFFICE.

STILLMAN WILKINS, OF ALBIA, IOWA.

PORTABLE LEMONADE-HOLDER AND GLASS-WASHER COMBINED.

SPECIFICATION forming part of Letters Patent No. 423,650, dated March 18, 1890.

Application filed November 11, 1889. Serial No. 329,945. (No model.)

*To all whom it may concern:*

Be it known that I, STILLMAN WILKINS, of Albia, in the county of Monroe and State of Iowa, have invented a new and useful Portable Lemonade-Holder and Glass-Washer Combined, of which the following is a full, clear, and exact description.

My invention relates to a portable apparatus for the convenient transportation of mixed drinks, and particularly lemonade, that is to be sold on the streets or in the places of traffic or amusement.

It has been usual where lemonade and like drinks have been sold at stands on street-sidewalks that the same, if prepared ready for immediate supply to patrons, be held in an open vessel, or, at best, covered in an imperfect manner, and thus be exposed to defilement from the contact of thronging insects and clouds of dust, the water for rinsing the glass tumblers used in dispensing the drink being in like manner rendered uncleanly by drowned flies. It has been found difficult in the ordinary way to keep lemonade cool and palatable which has been prepared in quantity for supply of casual customers, as exposure to the air directly injures its flavor, and the heat of the atmosphere speedily renders the ice-cold beverage warm and unpalatable.

In places of amusement or traffic, where crowds of people congregate, it is desirable to have a portable and convenient means for supplying patrons instantly with a clean, cool, refreshing drink when and where it may be desired, thus obviating the necessity of their seeking a place to obtain the same.

One object of my invention is to provide a compact, convenient, cleanly, and portable device whereby lemonade or similar liquid refreshment may be transported and dispensed in cool condition and be protected from contact with the atmosphere or encroachment of any kind of insects, and thus afford to patrons a cleanly, cool, and refreshing drink of non-intoxicant nature when it is desired, without their having to enter a saloon to obtain it.

A further object is to provide a glass-rinsing attachment for the portable beverage-holder which will also be sealed against the ingress of flies or dust, so that the tumblers used for dispensing the drink may be rendered clean and kept so.

With these ends in view my invention consists in certain features of construction and combinations of parts, which will be hereinafter described, and indicated in the claims.

Reference is to be had to the accompanying drawings, forming a part of this specification, in which similar letters of reference indicate corresponding parts in all the figures.

Figure 1 is a perspective view of the complete device. Fig. 2 is a side elevation, in section, of the beverage-holder and rinsing-vessel connected thereto; and Fig. 3 is a top plan view taken on the line $x\ x$ in Fig. 2.

Two preferably-cylindrical vessels A A' are provided. These are of the same dimensions, and have openings in their upper ends for access to the interior of each. The vessels A A', respectively, are the exterior shell of the beverage-holder and a rinsing-vessel. They are integrally connected sidewise by a vertical web $A^2$, on the upper opposite edges of which a bent handle B is attached, the location of said handle rendering it available for the convenient transportation of the entire device.

The vessels A A' each have similar depending concentric flanges $a\ a'$ affixed to the edges of the round orifices in their partially-closed upper ends, which flanges extend a sufficient distance downwardly to provide splash-guards for the vessels, which will retain their contents when the entire device is roughly jolted in its carriage from one place to another.

Within the vessel or shell A a smaller concentric cylindrical chamber B is secured by attachment of its upper edges at $b$ to the upper wall of the "holder," as the beverage-compartment is termed. The point of connection of the chamber B is preferably located about the center of the space which intervenes between the flange $a$ and the interior surface of the shell A, thus producing an annular splash-receiving channel $c$ contiguous to the lid-orifice, which will prevent any spilling of the contents, as has been previously mentioned.

The lid C of the beverage-holder is preferably constructed of sheet metal in plug form, so that it will fit neatly within the orifice produced by the flange $a$, its radial flange $a^2$ resting on the top surface of the upper wall of the beverage-holder, as shown in Fig. 2.

The adjacent vessel A' is, as before indicated, intended to receive clean water for the cleansing of glasses or cups in which the lemonade is served to customers. Said vessel is provided with a lid C', constructed to duplicate the lid C of the beverage-holder, fitting sufficiently close against the depending and encircling flange $a'$ to be retained in place and yet permit easy removal.

Within the vessel A' a bracket-plate D is secured to project from the vertical cylindrical wall of the same in a horizontal plane at a sufficient distance above the bottom of the vessel, so that glasses or drinking-cups of any material (represented at E in Fig. 2) may be retained in an upright position in circular perforations formed in this bracket plate or shelf.

A carrying-strap F is fastened removably and adjustably to the opposite upper edges of the combined chamber of the device, a buckle F' being loosely secured to the edge of the outer shell A of the beverage-holder, and a loop $F^2$ similarly fastened to the rinsing-vessel A', a snap-hook $F^3$ affording means for removable attachment of one end of the strap to the device, while the buckle F' permits the opposite end of said strap to be adjusted of a proper length to suit the person of the carrier and retain it at any desired point.

In use it is apparent that the lemonade, if properly prepared with ice-water, will be retained in a cold condition in mid-summer, owing to the dead-air space B', which serves as an insulator and protects the contents of the chamber B from being heated. The splashing of the contents of the rinsing-vessel A' will keep the drinking cups or glasses cool and clean ready for use, all dust and flies or other insects being excluded from both vessels.

The means for transporting the device renders it convenient to dispense the beverage in crowded places, as it can be slipped in front of the vender and be in position to serve a patron at a moment's notice.

Having thus described my invention, what I claim as new, and desire to secure by Letters Patent, is—

1. The combination, with a portable air-jacketed beverage-holder, of a rinsing-vessel attached thereto, substantially as set forth.

2. The combination, with an inner chamber and an outer chamber concentric thereto, forming a confined air-space completely around the inner chamber, of an attached rinsing-vessel and means to carry the combined device, substantially as set forth.

3. The combination, with an inner chamber and an outer chamber which is concentric with the inner chamber and spaced therefrom at its lower side, and a lid, of a rinsing-vessel attached to the outer chamber, a strap, and a handle to carry the combined device, substantially as set forth.

4. The combination, with a portable dead-air-jacketed beverage-holder and an attached rinsing-vessel, both provided with similar means to prevent outward splashing of liquid contents, of a sealing-lid for each compartment made in plug form from sheet metal, substantially as set forth.

5. The combination, with a beverage-holder and an attached rinsing-vessel, of a depending concentric flange for each compartment, which flanges are adapted to prevent splashing of the contents of said compartments when they are carried, substantially as set forth.

6. The combination, with a portable beverage-holder and an attached rinsing-vessel, of depending concentric flanges which are adapted to prevent splashing of the contents of these compartments, a handle, and a carrying-strap, substantially as set forth.

7. The combination, with a portable beverage-holder, an attached rinsing-vessel of the same outer conformation, lids of plug form for each compartment, and depending concentric flanges which prevent outward splashing of contents of the holder and rinsing-vessel, of an interior located bracket-plate which supports drinking-cups to be washed within the rinsing-vessel, a handle attached between the beverage-holder and rinsing-vessel, and an adjustable carrying-strap, substantially as set forth.

STILLMAN WILKINS.

Witnesses:
THOMAS TRIMBLE,
JOHN FOWBRING.